March 1, 1966 — J. O. HRUBY, JR — 3,237,772
FILTER SCREENS IN WATER BASINS
Filed Jan. 16, 1962

INVENTOR.
JOHN O. HRUBY, JR.
BY
J. M. Dubiel
ATTORNEY.

3,237,772
FILTER SCREENS IN WATER BASINS
John O. Hruby, Jr., Burbank, Calif., assignor to Rain Jet Corporation, Burbank, Calif., a corporation of California
Filed Jan. 16, 1962, Ser. No. 166,542
1 Claim. (Cl. 210—167)

This invention relates to a filter screen on the inlet end of a water pipe positioned in a body of water.

The filter screens of this invention are especially well suited for use in water display appliances, for example, in which water is pumped from a catch basin to one or more orifices and flows or falls back into the basin. Recirculating ornamental fountains and artificial waterfalls have become popular for indoor and outdoor displays and it is important that the water recirculating systems of these appliances be kept free from clogging by dirt and other solid particles so that the appliance may operate unattended for long periods of time. The filter screens of this invention are also advantageous for use in installations for drawing water from a pond or lake, for example, or from a running waterway.

It is a general object of this inventiion to provide a filter screen of the above-mentioned character which is simple in construction, easy to keep clean, reliable in operation, and economical to manufacture.

Further objects and advantages of the invention will appear during the course of the following part of this specification wherein the details of construction and mode of operation of two presently preferred embodiments are described with reference to the accompanying drawing in which.

Figure 1:
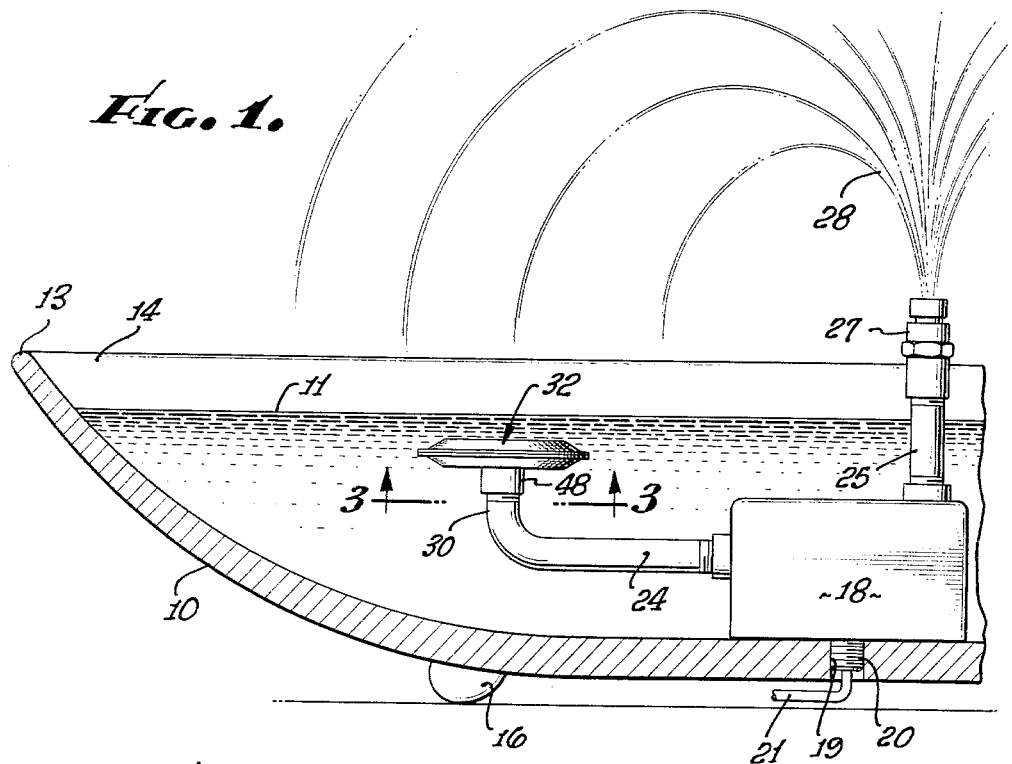
FIG. 1 is a vertical section through a portion of a water basin having a water circulating system therein shown in side elevation, the system having a filter screen of this invention.

In the drawing, the invention is illustrated as embodied in an ornamental water fountain. Reference numeral 10 designates a large shallow basin containing water, the surface of the water being designated by numeral 11. The rim of the basin is designated by numeral 13 and its top opening, defined by the rim, by numeral 14. Preferably, the basin may have a plurality of feet, one of which appears at 16, for standing the basin on a flat surface with its rim extending in a horizontal plane.

In the center of the basin is a pump 18 of conventional construction, the pump being secured to the basin by means of a short pipe 19 screw-threaded in a tapped hole 20 in the bottom of the basin. Pipe 19 serves to support the pump in the basin, and to accommodate an electric cord 21 for energization of the pump.

There is a water inlet pipe 24 to the pump and a vertical outlet pipe or riser 25. Upon the upper end of the riser is a nozzle 27 positioned above the surface 11 of water in the basin, for emitting a fountain spray represented at 28. The spray falls down into the basin, the pump being of a capacity or otherwise regulated with respect to the size of the fountain nozzle so as to maintain a predetermined level of water in the basin above the opening for inlet to the pump.

The inlet pipe 24 has a vertically extending inlet end portion 30. A filter screen, designated generally by numeral 32 is mounted atop the inlet end of the inlet pipe and positioned below the surface of water in the basin. The filter screen 32 illustrated in FIGS. 1–3, comprises a circular hollow shell of generally biconvex configuration formed of two complimentary dished sheets 33 and 34 of stiff material, e.g. brass or plastics, and these sheets have small filter openings 36 spaced throughout their surfaces. Each of the sheets 33 and 34 is of generally frusto-conical configuration, the several wall portions of the upper sheet 33 being a frusto-conical marginal portion 38, a flat central portion 39, and a peripheral flange 40. The frusto-conical marginal portion of the lower sheet 34 is designated by reference numeral 42, its central portion by numeral 43, and its peripheral flange by numeral 44. The sheets are suitably secured together throughout their peripheral flanges as with solder 45, for example, in the case where the sheets are formed of metal. The central flat portions 39 and 43 form what may be called the side walls of the biconvex shell, and in the illustrated embodiment, they are parallel to each other. Interconnection of the peripheral flanges occurs along a medial horizontal plane through the shell.

The lower sheet 34 has a central opening 47. A nipple 48 is joined to the sheet 34 circumferentially of the central opening 47 as by a solder bead 49. The nipple is internally screw-threaded as shown at 50 for connection upon the vertically extending end portion 30 of the inlet pipe 24, the axis of the nipple being perpendicular to the medial plane defined by the periphery of the shell whereby the nipple positions the filter shell 32 with its medial plane extending generally horizontally in the basin. Preferably, the thickness of the shell, i.e. axial dimension between its flat side wall portions 39 and 43, is about the same size as the diameter of the bore 51 of the inlet pipe 24, and the diameter of the screen is at least about three times its thickness.

The filter openings 36 of the bottom sheet 34 are not exposed to particles settling down in the water such as would cover and plug the filter openings. The upper sheet 33 is positioned for convenient washing thereof by a jet of water from a hose for example.

Figure 2:
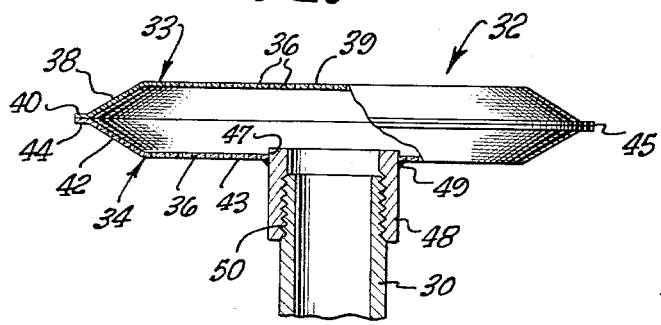
FIG. 2 is a side elevation of the filter screen on a larger scale, the same being cut away to show a substantial part of the screen in vertical section.
Figure 3:
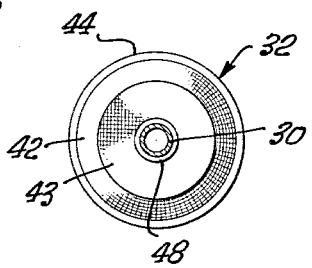
FIG. 3 is a view of the underside of the filter screen taken upon a plane indicated by line 3—3 of FIG. 1.
Figure 4:
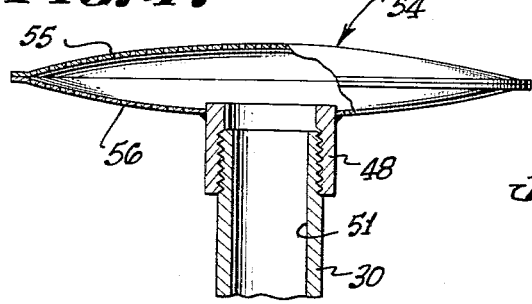
FIG. 4 is a view similar to that of FIG. 2 but showing another form of the filter screen of this invention.

Referring to FIGURE 4, the filter screen embodying this invention and shown therein is designated generally by reference numeral 54 and it differs from that of the FIGURES 1–3 embodiment only in its perforated sheets 55 and 56, corresponding to sheets 33 and 34 of filter device 32, the sheets 55 and 56 being segments of a sphere rather than of frusto-conical shape as in the embodiment of FIGURES 1–3.

While the invention has herein been shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices.

Having described the invention what is claimed as new in support of Letters Patent is:

A recirculating water fountain comprising:
a relatively shallow basin having a rim disposed in a generally horizontal plane and defining the top opening of the basin, a pump in said basin including a housing having its upper wall located a distance below the level of said rim, whereby said basin is adapted to be filled with water to a given normal level above said housing, an upright outlet pipe rising directly from the upper wall of said housing, a nozzle on the upper end of said outlet pipe located above the rim of said basin, an inlet pipe extending generally horizontally from a side wall of said pump housing and terminating at its outer end in a generally vertical upwardly directed extremity, a hollow, generally flat disc-like filter coaxially mounted on the upper end of said upwardly directed inlet pipe extremity, the diameter of said filter being many times its axial dimension, said filter having a medial plane normal to the axis of the filter and generally parallel to the plane of said rim, whereby said filter has an upper, upwardly presented wall and a lower, downwardly presented wall, said filter walls being perforated with openings of generally uniform size, and said medial plane of said filter being located above the upper wall of said pump housing and just slightly below said given level to which said basin is adapted to be filled with water, whereby the lower wall of said filter is located a substantial distance from the bottom wall of the basin and the upper wall of said filter is located adjacent the surface of water in the basin.

References Cited by the Examiner

UNITED STATES PATENTS

| | | | |
|---|---|---|---|
| 1,136,995 | 4/1915 | Bataglia | 239—20 |
| 1,202,723 | 10/1916 | Jackson | 210—460 X |
| 1,940,208 | 12/1933 | Dieman | 210—460 X |
| 2,167,055 | 7/1939 | Trowbridge. | |
| 2,572,379 | 10/1951 | Pearse | 239—20 |
| 2,674,574 | 4/1954 | Pettas | 210—169 |

REUBEN FRIEDMAN, *Primary Examiner.*

HERBERT L. MARTIN, *Examiner.*